United States Patent
Lindoff et al.

(10) Patent No.: US 10,297,142 B2
(45) Date of Patent: May 21, 2019

(54) METHODS AND ARRANGEMENTS FOR ALERT MESSAGE DETECTION IN LOW LATENCY SYSTEMS

(71) Applicant: Telefonaktiebolaget LM Ericsson (publ), Stockholm (SE)

(72) Inventors: Bengt Lindoff, Bjärred (SE); Shehzad Ali Ashraf, Aachen (DE); Robert Baldemair, Solna (SE); Fredrik Lindqvist, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/547,096

(22) PCT Filed: Jan. 30, 2015

(86) PCT No.: PCT/EP2015/051972
§ 371 (c)(1),
(2) Date: Jul. 28, 2017

(87) PCT Pub. No.: WO2016/119893
PCT Pub. Date: Aug. 4, 2016

(65) Prior Publication Data
US 2018/0025622 A1 Jan. 25, 2018

(51) Int. Cl.
*G08B 29/18* (2006.01)
*H04W 76/50* (2018.01)
(Continued)

(52) U.S. Cl.
CPC ........ *G08B 29/185* (2013.01); *H04L 12/1895* (2013.01); *H04W 24/02* (2013.01); *H04W 76/50* (2018.02); *G08B 29/123* (2013.01)

(58) Field of Classification Search
CPC ... G08B 29/123; H04L 12/1895; H04L 7/042; H04L 7/0054; H04W 76/007; H04W 72/087
(Continued)

(56) References Cited

U.S. PATENT DOCUMENTS 5,828,300 A 10/1998 Addy et al.
6,087,933 A * 7/2000 Addy .................. G08B 29/123
340/506

(Continued)

FOREIGN PATENT DOCUMENTS

EP 1770923 A2 4/2007

OTHER PUBLICATIONS

ETSI, "Digital cellular telecommunications system (Phase 2+); Universal Mobile Telecommunications System (UMTS); LTE• ' BNSOOCIO: <XP_ 14223397A _ I_> Service requirements for Machine-Type Communications (MTC); Stage 1 (3GPP TS 22.368 version 12.4.0 Release 12)", ETSI TS 122 368 V12.4.0, Oct. 2014, 1-24.

(Continued)

*Primary Examiner* — Adnan Aziz
(74) *Attorney, Agent, or Firm* — Murphy, Bilak & Homiller, PLLC

(57) ABSTRACT

The present disclosure relates to methods and devices in clustered alarm scenarios. More particularly the disclosure pertains to methods and arrangements for detecting several messages of a preconfigured message type, arriving sequentially in time. This disclosure proposes a method, performed in a radio network node, of detecting several messages of a preconfigured message type. The method comprises detecting SI a first message of the preconfigured message type, the first message being associated with an event. The method further comprises reconfiguring S3, in the radio network (Continued)

node, in response to the detection, at least one radio setting related to detecting further messages of the preconfigured message type and monitoring S4 a radio spectrum for further messages of the preconfigured message type using the reconfigured radio settings.

16 Claims, 4 Drawing Sheets

(51) Int. Cl.
   *H04L 12/18* (2006.01)
   *H04W 24/02* (2009.01)
   *G08B 29/12* (2006.01)
(58) Field of Classification Search
   USPC .......................................................... 340/506
   See application file for complete search history.

(56) References Cited

U.S. PATENT DOCUMENTS

| | | | | |
|---|---|---|---|---|
| 7,019,645 | B2* | 3/2006 | Sacksteder | G06K 7/0008 340/539.22 |
| 7,091,827 | B2* | 8/2006 | Stilp | G06K 7/0008 340/10.1 |
| 2006/0100002 | A1* | 5/2006 | Luebke | G06F 3/0362 455/574 |
| 2012/0280792 | A1* | 11/2012 | Andersen | H04W 8/245 340/7.51 |
| 2013/0044657 | A1* | 2/2013 | Oh | H04W 74/0875 370/310 |
| 2013/0083648 | A1* | 4/2013 | de Ruijter | H04L 69/40 370/216 |
| 2013/0155864 | A1* | 6/2013 | Yoshizawa | H04W 4/08 370/235 |
| 2013/0281139 | A1* | 10/2013 | Wilhelmsson | H04W 52/0245 455/500 |
| 2015/0009813 | A1* | 1/2015 | Nguyen | H04W 4/005 370/230 |

OTHER PUBLICATIONS

Unknown, Author, "RACH congestion evaluation and potential solutions", 3GPP TSG RAN WG2 #70, R2-102824, Montreal, Canada, May 10-14, 2010, 1-6.

* cited by examiner

METHODS AND ARRANGEMENTS FOR ALERT MESSAGE DETECTION IN LOW LATENCY SYSTEMS

TECHNICAL FIELD

The present disclosure relates to methods and devices in clustered alarm scenarios. More particularly the disclosure pertains to methods and arrangements for detecting several messages of a preconfigured message type, arriving sequentially in time.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD and Time Division Duplex, TDD, modes.

In 5G, i.e. 5th generation mobile networks, there will be evolvement of the current LTE system to 5G. The main task for 5G is to improve throughput and capacity compared to LTE. This is achieved by increasing the sample rate and bandwidth per carrier. 5G is also focusing on use of higher carrier frequencies i.e. above 5-10 GHz.

One main object of a 5G radio concept is to support highly reliable ultra-low delay Machine-Type Communication, MTC, i.e., Critical-MTC. The Critical-MTC concept should address the design trade-offs regarding e.g., end-to-end latency, transmission reliability, system capacity and deployment, and provide solutions for how to design a wireless network for different industrial-application use cases. The Critical MTC system should in particular allow for radio resource management that allows the coexistence between different classes of applications: sporadic data, e.g., alert messages, periodic data, and others with e.g. real-time data (or simply best-effort data).

One approach is to mix C-MTC applications with ordinary Mobile Broadband, MBB, traffic on the newly defined 5G. Hence, similar random access procedures as well as scheduling request procedures may be used for C-MTC applications as for MBB service, however with much tighter latency requirements/response times and/or reliability requirements.

Alert messages e.g., alarms is probably one important type of messages that needs support for critical MTC application. Alarms are typically rare events. Hence, the alarm may be of Random Access type in some cases while in other cases, where we can assume that wireless device has reasonable sync to the network node, a scheduling request may be used.

In many automation scenarios it might be likely that alarms come in clusters. That means, once a sensor is transmitting an alarm it is likely that other sensors may transmit alarms almost at the same time or very short time after the first alarm. A simple example of such type of alarm is the temperature/smoke alarm that could simultaneously trigger several closely spaced sensors. The alarms or alerts may come in the order of milliseconds, and then the network might not be able to detect the alarm message(s) with possible fatal problem/failure as a potential cause.

In any case, the system needs to be designed such that rare alarm events may be transmitted with very low latency and detected with high reliability.

One simple prior art solution for avoiding such risk for collisions is to allocate separate frequency/time resources for random access/scheduling request to all sensors sufficiently often in order to fulfill the latency requirements. However with that approach significantly amount of resources need to be pre-allocated that typically would not be used and hence very low system capacity is achieved.

Another approach is to use a high complexity detector algorithm, however using such an algorithm for monitoring rare events may imply that a lot of hardware capacity in the receiving network node, also referred to as message detector, is allocated to the complex detector algorithm instead of serving ordinary cellular traffic in the system, giving reduction in the system capacity, or increased cost for the hardware and/or software in the network node to maintain simultaneously high capacity system and high complexity detector.

However, it is desirable being able to handle clustered alarm situations in a good way such that the high reliability detection is maintained at the same time as an acceptable false alarm rate is achieved and complexity of the detector is maintained on an acceptable level.

SUMMARY

An object of the present disclosure is to provide a radio network node which seeks to mitigate, alleviate, or eliminate one or more of the above-identified deficiencies in the art and disadvantages singly or in any combination.

This object is achieved by a method, performed in a radio network node, of detecting several messages of a preconfigured message type. The method comprises detecting a first message of the preconfigured message type, the first message being associated with an event. The method further comprises reconfiguring, in the radio network node, in response to the detection, at least one radio setting related to detecting further messages of the preconfigured message type and monitoring a radio spectrum for further messages of the preconfigured message type using the reconfigured radio settings.

By using reconfigured settings, wherein the reconfiguration increases capability to detect e.g. overlapping messages or messages affected by interference, the risk of missing a further message of the preconfigured message type is avoided. Hence, the disclosure improves the alert message detection performance in scenarios, where multiple alarms may be triggered at approximately the same time. The disclosure improves good trade-off between system capacity, network node complexity and reliability in the communication between the C-MTC devices transmitting the messages and network node is achieved.

According to some aspects, the reconfiguring comprises reconfiguring at least one radio setting during a predefined time period after the detection of the first message. By changing the settings during a predefined time, messages received during times when it is a "high probability" to receive further messages, the risk of fault detection is reduced.

According to some aspects, the reconfiguring comprises enabling a capability to detect several messages of the preconfigured messages type that are at least partly overlapping in time. The radio settings may be reconfigured such that overlapping messages may be received. According to some aspects, the reconfiguring comprises enabling or disabling one or more hardware units. Hence, overlapping messages or messages affected by interference are not missed. By adding processing or hardware resources, then the error rate may be kept the same.

According to some aspects, the reconfiguring comprises monitoring additional radio resources. If the requests are sent on different channels in time and or frequency, there is no risk for collision.

According to some aspects, the reconfiguring implies changing the false detection rate in the network node. According to some aspects, the reconfiguring comprises modifying a detection threshold in the radio network node. By lowering a detection threshold, the risk of missing data is reduced. This may be desirable if it is known that new messages are likely to occur within a certain time period. If a detection threshold is decreased, the false-detection rate typically increases.

According to some aspects, the message type is alert message or alarm message. According to some aspects, the first message is a random access message. According to some aspects, the first message is a scheduling request.

According to some aspects, the method further comprises the step of transmitting a response message to the sender of the first message. According to some aspects, the method further comprises the step of detecting a further message of the preconfigured message type. According to some aspects, the method further comprises the step of reverting to at least one of the radio settings used before detecting the first message. A while after the detection of the first message, the probability to receive further messages is decreased. Hence, the network node may then revert to the original settings in order to save (or free up) power or processing resources.

According to some aspects, the disclosure relates to a computer program comprising computer program code which, when executed, causes a radio network node to execute the methods described above and below.

According to some aspects, the disclosure relates a network node, in a wireless communication system. The network node is configured for detecting several messages of a preconfigured message type. The network node comprises a radio communication interface, a network communication interface, configured for communication with other network nodes, and processing circuitry. The processing circuitry is configured to cause the network node to detect a first message of the preconfigured message type, the first message being associated with an event, to reconfigure, in the radio network node, in response to the detection, at least one radio setting related to detecting further messages of the same preconfigured message type and to monitor a radio spectrum for further messages of the preconfigured message type using the reconfigured radio settings.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
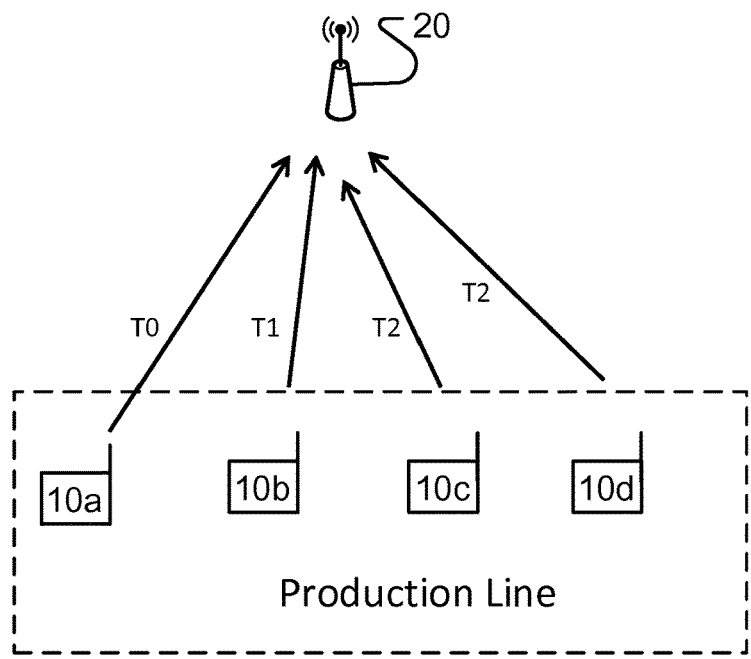
FIG. 1a is illustrating embodiments of one network, where the proposed methods may be implemented.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

FIG. 1a is illustrating embodiments of a network, where the proposed methods may be implemented. In this example, four wireless devices 10a-10d, here being sensors, monitor a first production line. Each sensor is connected to or integrated with a modem that may communicate with an access point or base station. Hence, from a radio perspective the sensor devices are referred to as user equipments, UE, which is the term used by 3GPP standardization.

This is an example scenario. During a long time, e.g. min/hours/days, no alarms are reported. Suddenly at time T0 sensor 10a detects a problem, and sends an alarm e.g. including a scheduling request. The network node 20, here also referred to as an alert message detector, then needs to allocate uplink resources in order for the sensor to report the exact alarm message. However, due to cascading failures and/or problems in the production line, an adjacent sensor 10b triggers an alarm at time T1, and a third and a fourth sensor 10c, 10d at time T2. All these errors may come in the order of milliseconds, and as in the example above alarms from 10c and 10d collide and the network node might not be able to detect the alarm message(s) with possible fatal problem and/or failure as a potential cause.

Figure 1B:
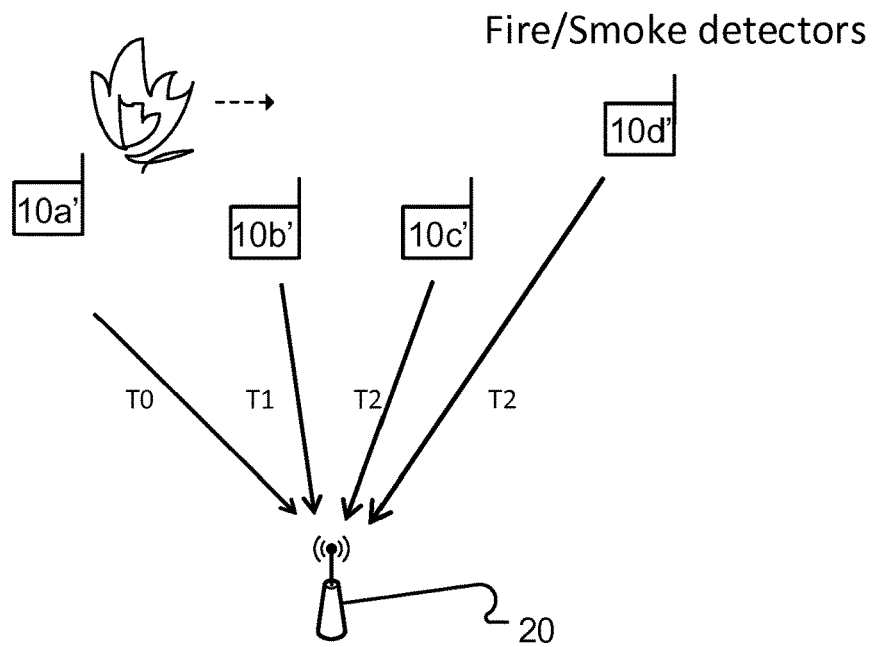
FIG. 1b is illustrating embodiments of another network, where the proposed methods may be implemented.

FIG. 1b illustrates another example scenario. In this example there are four fire/smoke detectors 10a'-10d'. The detectors are located in vicinity of each other, e.g. in a building. If one of the detectors gives an alarm due to e.g. a fire, there is then an increased probability that there will be more alarms in a near future. The fire may affect all different kinds of sensors including battery, fire, temperature, smoke, software etc. Hence, at e.g. a fire, many alarms may occur in a very short time period.

Figure 2A:
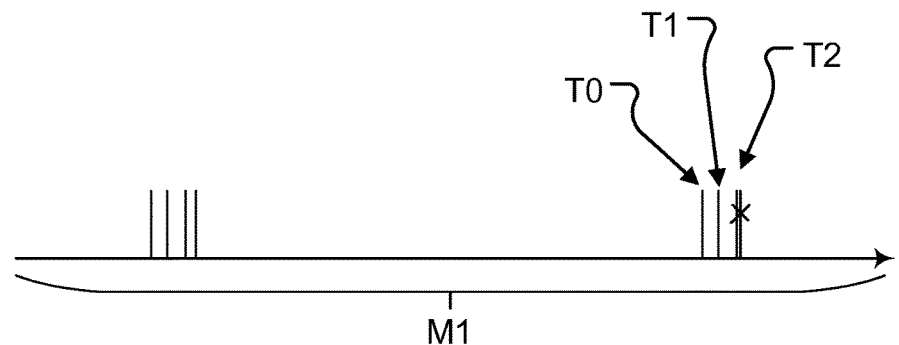
FIG. 2a illustrates clustered alarms in a time scheme.
Figure 2B:
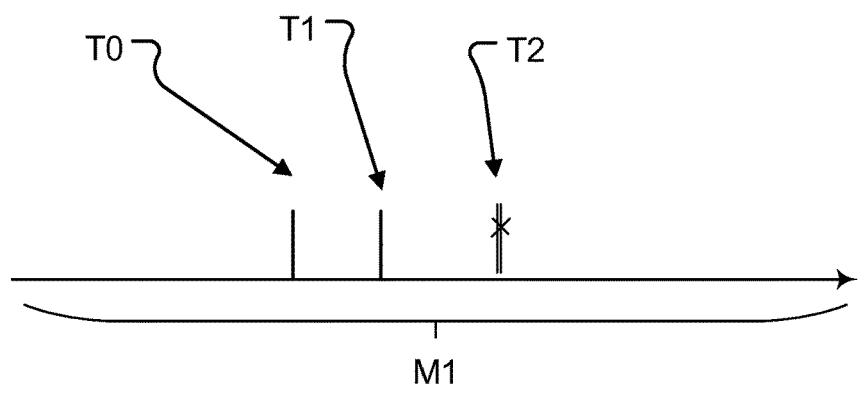
FIG. 2b illustrates that colliding alarms are not correctly detected.

FIG. 2a is a time scheme illustrating how alarms from sensors are clustered in time. FIG. 2b illustrates that colliding alarms at time T2 are not correctly detected. In this method the same radio configuration or detection method M1 is used all the time. This configuration is typically power or resource efficient. However, the method cannot be used to detect several overlapping alarms.

As mentioned above, one approach is to use a high complexity detector algorithm. However using such an algorithm for monitoring rare events may imply that a lot of hardware capacity in the receiving network node, also referred to as message detector, is allocated to the complex detector algorithm instead of serving ordinary traffic in the system, giving reduction in the system capacity, or increased cost for the hardware and/or software in the network node to maintain simultaneously high capacity system and high complexity detector.

The basic concept of the disclosure is to dynamically adapt or adjust the radio capabilities of an alert message detector 20 based on the likelihood of receiving alarms. This concept is using the fact that, in some scenarios, once a first alarm is detected the likelihood for alarms or alerts from other sensors are high, the alert message detector is adapted for improved performance. Then, the high performance detection mode is only used when there is a high probability to receive messages, wherein overall power consumption is reduced.

In a first example, once a first alarm is reliable detected, the threshold for detection of alert messages are lowered increasing the reliability of detection at the price of also increasing the false alarm rate. In another example the detector algorithm is adapted to a more complex detector, for instance a detector capable of detecting multiple alert messages transmitted at the same frequency/time resources, here referred to as a joint detector. In yet another example more hardware resources e.g. processors, are allocated to the detector. The adaptation of the detector is in a typical embodiment made during a pre-determined time period after a first alarm is detected. Hence, by enabling extra resources the risk of missing alarms may be reduced during certain time periods.

Figure 2C:
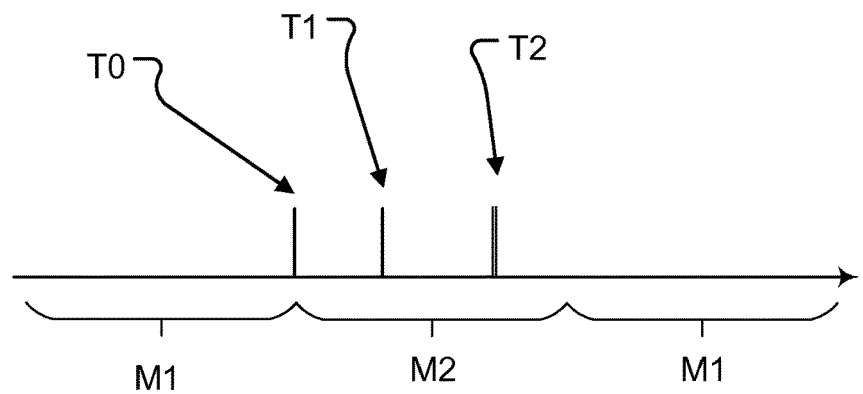
FIG. 2c illustrates detecting colliding alarms using the proposed methods.

FIG. 2c illustrates detecting colliding alarms using the proposed methods. As in the example above, the detector uses a default detection method, M1. This method is typically quite power efficient, but not so efficient in terms of handling overlap and/or interference. In this example, once one alarm is detected, the settings of the message detector are reconfigured to detection method M2. Detection method M2 is e.g. capable of detecting several simultaneous alarms. Hence, alarms overlapping in time, at T2, are correctly detected.

In the description below we discuss alarm or alert messages and scheduler action made once an alarm is detected in the network node. The alarm or alert message may be a message transmitted rather seldom. Hence, it may in some embodiments use random access channels and in other embodiments scheduling requests. However, the disclosure is not limited to these kinds of channels, but covers other channels with similar irregular occurrence, and where similar alert messages may be transmitted from associated sensors/modems etc. in a short time frame after a first sensor triggered an alert message.

Figure 3:
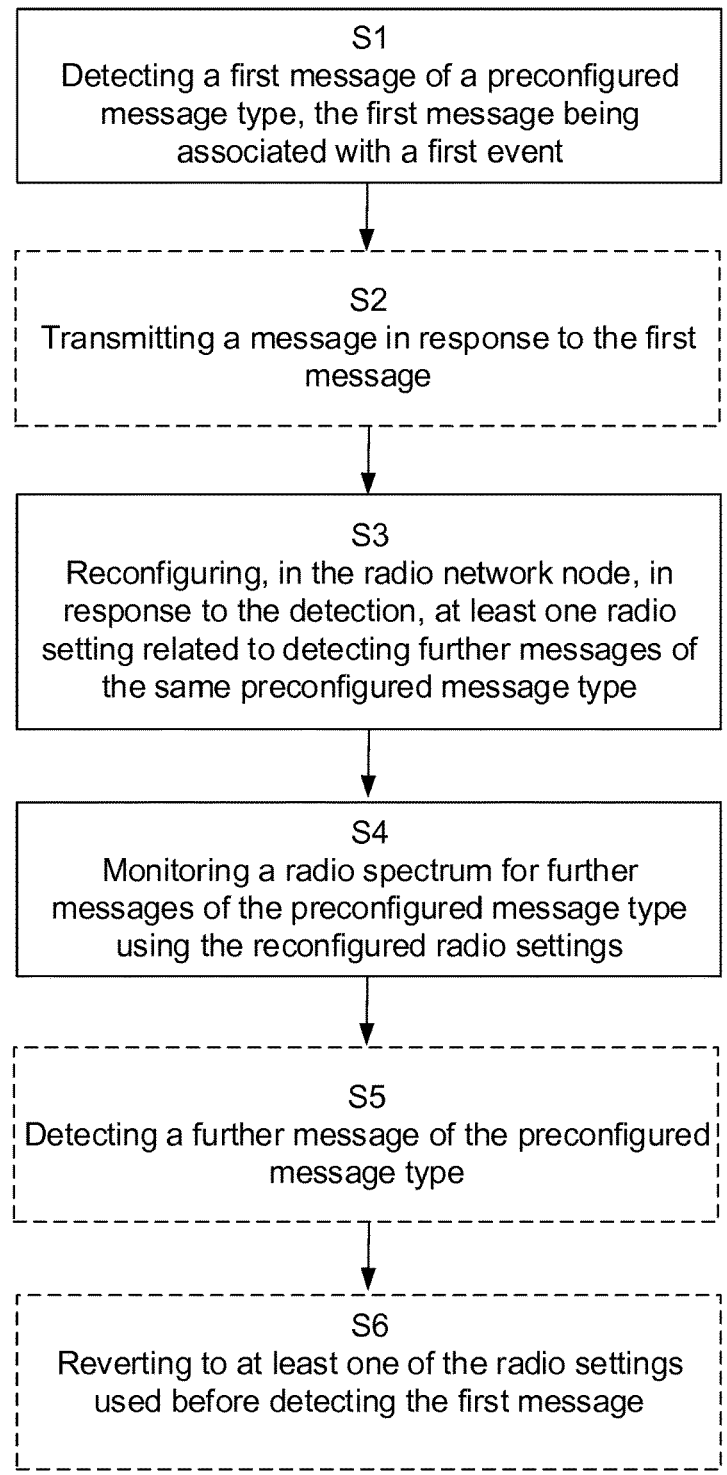
FIG. 3 is a flowchart illustrating embodiments of method steps in a network node.
Figure 4:
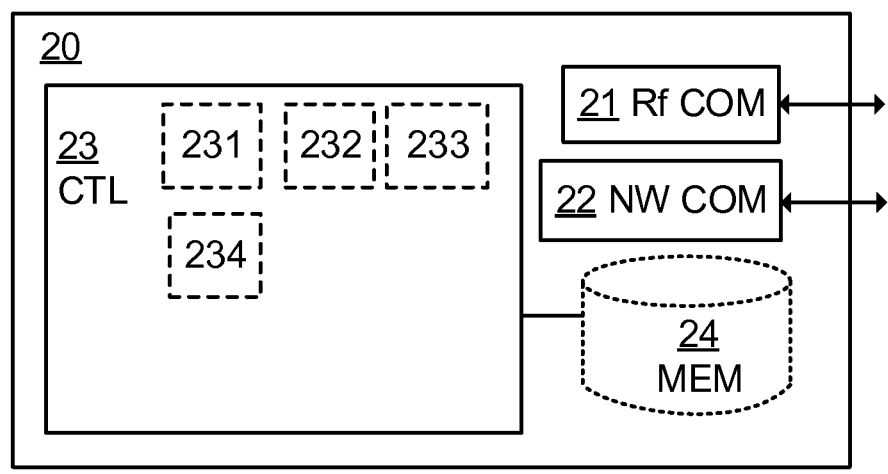
FIG. 4 is an example node configuration of a network node, according to some of the example embodiments.

The proposed technique will now be described referring to FIG. 3 illustrating example node operations in a network node and FIG. 4 illustrating an example node configuration for performing these node operations.

It should be appreciated that FIGS. 3 and 4 comprises some operations and modules which are illustrated with a solid border and some operations which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations need not be performed in order.

FIG. 4 illustrates an example network node, configured for detecting several messages of a preconfigured message type. The network node, in this application also referred to as detector or alert message detector, is typically a radio network node or base station, such as an eNodeB in LTE. The network node 20 comprises radio communication interface 21, a network communication interface 22 and processing circuitry 23.

The radio communication interface 21 is configured for communication with wireless devices within reach of the network node over a radio communication technology. In particular the radio communication interface 21 is adapted to receive messages of the predetermined message type, i.e. alarms or alert messages.

The network communication interface 22 is configured for communication with other network nodes. This communication is often wired e.g. using fiber. However, it may as well be wireless. The connection between network nodes is generally referred to as the backhaul.

The controller, CTL, or processing circuitry 23 may be constituted by any suitable Central Processing Unit, CPU, microcontroller, Digital Signal Processor, DSP, etc. capable of executing computer program code. The computer program may be stored in a memory, MEM 24. The memory 24 can be any combination of a Read And write Memory, RAM, and a Read Only Memory, ROM. The memory 24 may also comprise persistent storage, which, for example, can be any single one or combination of magnetic memory, optical memory, or solid state memory or even remotely mounted memory.

According to some aspects, the disclosure relates to a computer program comprising computer program code which, when executed, causes a radio network node to execute the methods described above and below.

The processing circuitry 23 is configured to perform the proposed methods of detecting several messages of a preconfigured message type. Hence, the processing circuitry 23 is configured to detect a first message of the preconfigured message type, the first message being associated with an event and to reconfigure, in the radio network node, in response to the detection, at least one radio setting related to detecting further messages of the preconfigured message type. The processing circuitry 23 is further configured to monitor a radio spectrum for further messages of the preconfigured message type using the reconfigured radio settings.

The proposed methods performed in a network node 20, here referred to as an alert message detector, will now be described in more detail referring to FIG. 3. It should be appreciated that the example operations of FIG. 3 may be performed simultaneously for any number of radio network nodes in the wireless communications network.

We refer back to the scenarios in FIG. 1. Hence, an alert message detector 20, e.g. an eNodeB, is monitoring the uplink, UL, for alert messages. The alert message detector is using a configuration referred to as a first detection method M1. Hence, the monitoring is made using a first detection method M1. The first detection method corresponds e.g. to a detector capable of only detecting a single alert message at a first frequency/time resource(s) or a detector with a first false alarm detection rate or a detector using a first set of hardware units. The first detection method could also be a combination thereof.

The proposed method comprises in a first step S1, detecting a first message of the preconfigured message type, wherein the first message is associated with an event. The message is received from a first wireless device. The message is detected using the first detection method. The message type is e.g. an alert message or alarm message. One example would be a MTC Feature Priority Alarm Message, PAM, defined in 3GPP, which is intended for use with MTC Devices that issue a priority alarm in the event of e.g. theft, vandalism or other needs for immediate attention. However, there may also be other message types defined.

The message is associated with an event implying e.g. that it is triggered or caused by an event. An event is something that happens at a given place and time. An event may occur sporadically. The event is e.g. a sensor alarm. One example is an alarm from a sensor being triggered to send a message of a preconfigured message type under certain conditions. Alarms triggered by sensors that are somehow related (e.g. located in vicinity) typically occur within a short time period as shown in FIGS. 2a to 2c. One example of related sensors is fire and/or smoke sensors in a building. Events may also be alarms or indications of software updates, low battery level or temperature increase or decrease.

A sensor that triggers an alarm typically needs uplink resources for sending further information about the event. Hence, the first message is e.g. a random access message or a scheduling request on an uplink control channel as discussed above. The network node 20 may comprise a detector module 231 configured to detect the first message.

According to some aspects, the method of any preceding claim further comprises the step of transmitting S2 a response message to the sender of the first message. Once an alert message being a random access message or a request for uplink resources has been detected the scheduler transmits an uplink, UL, grant to the sensor/device associated with the detected alert message. The network node 20 may comprise a detector module 232 configured to transmit a response message.

In a next step the method comprises reconfiguring S3, in the radio network node, in response to the detection S1, at least one radio setting related to detecting further messages of the preconfigured message type. Hence, the network node now adapts the alert message detection method and monitors the uplink for alert messages using a second detection method, M2. The network node 20 may comprise a reconfiguration module 233 configured to reconfigure the radio settings.

According to some aspects, the reconfiguring S3 comprises enabling a capability to detect several messages of the preconfigured messages type that are at least partly overlapping in time. Thus, the second detection method comprises e.g. using a detector capable to detect multiple alert messages at a first frequency and/or time resource simultaneously, i.e. a joint detector. According to some aspects, the reconfiguring comprises enabling or disabling one or more hardware units such as processor units, receivers or receive antennas.

According to some aspects, the reconfiguring comprises monitoring additional radio resources in time and/or frequency.

According to some aspects, the reconfiguring implies changing the false detection rate in the network node. This may be implemented by modifying a detection threshold in the radio network node. The detection threshold is e.g. defined as a number of errors per message that are allowed, while still considering a message being correctly detected. One example is using a detector with a second false alarm detection rate, which is higher than the first false alarm rate, but which detector is less likely to miss messages, even if they are partly or completely overlapping. Another example is using a detector using a second set of hardware units which is larger than the first set. Hence, the second detection method may detect messages of the preconfigured message type even if there is interference or overlap.

The method further comprises monitoring S4 a radio spectrum for further messages of the preconfigured message type using the reconfigured radio settings. Using the reconfigured radio settings implies a decreased risk of missing messages of the preconfigured message type, because resources for e.g. simultaneous detection are introduced. The network node 20 may comprise a monitoring module 234 configured to monitor a radio spectrum for further messages.

According to some aspects, the method of any preceding claim further comprises the step of detecting S5 a further message of the preconfigured message type. The further message may be triggered by the same event as the first message or of a related message. However, by using the reconfigured radio settings, alarms are less likely to be missed. Thus, with the proposed technique, every time a new alert message being a random access message or a request for uplink resources is detected uplink grants are transmitted to the sensors/devices associated with the detected alarm message.

According to some aspects, the reconfiguring comprises reconfiguring at least one radio setting during a predefined time period after the detection of the first message. Then a timer is started, when the radio settings are reconfigured. This is in optional embodiments made until the timer is expired when the detector is adapted to the first detection method again. The timer may be application specific but typically in the range of seconds to minutes even if the disclosure is not limited to such ranges. Hence, according to some aspects, the method further comprises the step of reverting S6 to at least one of the radio settings used before detecting the first message.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, GSM, WLAN, and Bluetooth may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, discovery signal device, access node/point, or repeater. A radio network node herein may comprise a radio network node operating in one or more frequencies or frequency bands. It may be a radio network node capable of CA. It may also be a single- or multi-RAT node. A multi-RAT node may comprise a node with co-located RATs or supporting multi-standard radio (MSR) or a mixed radio network node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a radio network node, of detecting messages of a preconfigured message type, the method comprising:
    detecting a first message of the preconfigured message type, the first message being associated with an event;
    reconfiguring, in the radio network node, in response to the detection, at least one radio setting related to detecting further messages of the preconfigured message type, the reconfiguration involving switching from a first detection method to a second detection method, the second detection method providing, relative to the first detection method, an increased capability of detecting messages of the preconfigured message type that are overlapping or affected by interference; and
    monitoring a radio spectrum for further messages of the preconfigured message type using the reconfigured at least one radio setting.

2. The method of claim 1, wherein monitoring the radio spectrum for further messages of the preconfigured message type using the reconfigured at least one radio setting comprises monitoring during a predefined time period after the detection of the first message.

3. The method of claim 1, wherein the first detection method has lower power consumption or complexity relative to the second detection method and is used as a default reception method, and wherein the second detection has higher power consumption or complexity relative to the first detection method, but provides at least one of:
    interference suppression for improved reception of messages in the presence of interference at the radio network node, and
    joint detection for improved reception of messages that at least partly overlap in time.

4. The method of claim 1, wherein the reconfiguring comprises enabling or disabling one or more hardware units.

5. The method of claim 4, wherein the reconfiguring comprises enabling more receiver branches or antennas.

6. The method of claim 1, wherein the reconfiguring comprises monitoring additional radio resources.

7. The method of claim 1, wherein the reconfiguring implies changing a false detection rate in the radio network node.

8. The method of claim 7, wherein the reconfiguring comprises modifying a detection threshold in the radio network node.

9. The method of claim 1, wherein the preconfigured message type is an alert message or an alarm message.

10. The method of claim 1, wherein the first message is a random access message.

11. The method of claim 1, wherein the first message is a scheduling request.

12. The method of claim 1, further comprising transmitting a response message to the sender of the first message.

13. The method of claim 1, further comprising detecting a further message of the preconfigured message type while monitoring the radio spectrum for further messages of the preconfigured message type using the reconfigured at least one radio setting.

14. The method of claim 1, further comprising reverting to the first detection method after a defined period, or after not receiving any further messages of the predefined type for a defined period.

15. A non-transitory computer readable medium storing a computer program for detecting messages of a preconfigured message type, the computer program comprising computer program code that, when executed on at least one processor of a radio network node, causes the radio network node to:
  detect a first message of the preconfigured message type, the first message being associated with an event;
  reconfigure, in the radio network node, in response to the detection, at least one radio setting related to detecting further messages of the preconfigured message type, the reconfiguration involving switching from a first detection method to a second detection method, the second detection method providing, relative to the first detection method, an increased capability of detecting messages of the preconfigured message type that are overlapping or affected by interference; and
  monitor a radio spectrum for further messages of the preconfigured message type using the reconfigured at least one radio setting.

16. A network node in a communication system, the network node being configured for detecting messages of a preconfigured message type, the network node comprising:
  a radio communication interface;
  a network communication interface configured for communication with other network nodes; and
  processing circuitry configured to cause the network node to:
    detect, via the radio communication interface, a first message of the preconfigured message type, the first message being associated with an event;
  reconfigure, in the network node, in response to the detection, at least one radio setting related to detecting further messages of the preconfigured message type, the reconfiguration involving switching from a first detection method to a second detection method, the second detection method providing, relative to the first detection method, an increased capability of detecting messages of the preconfigured message type that are overlapping or affected by interference; and
  monitor, via the radio communication interface, a radio spectrum for further messages of the preconfigured message type using the reconfigured at least one radio setting.

* * * * *